INVENTORS.
FERNAND J. DEWEZ, JR. and
JOHN E. STEINER
By Donald G. Dalton
Attorney

United States Patent Office 3,467,808
Patented Sept. 16, 1969

3,467,808
ELECTROSLAG WELDING METHOD FOR FABRICATING HEAVY FORGINGS
Fernand J. Dewez, Jr., Monroeville, and John E. Steiner, Edgewood, Pa., assignors to United States Steel Corporation, a corporation of Delaware
Filed Jan. 26, 1967, Ser. No. 612,034
Int. Cl. B23k 9/18
U.S. Cl. 219—73                                    15 Claims

ABSTRACT OF THE DISCLOSURE

The method of fabricating a heavy forging from a first forging and a second forging comprising the steps of positioning the first forging and the second forging to provide a mold cavity having a gap width, extending the mold cavity to provide the mold cavity with peripheral edge defect extensions, and electroslag welding together the first forging and the second forging with a weldment having a composition matching that of the first forging and the second forging, the weldment having a substantially vertical dendrite growth by maintaining during the electroslag welding a form factor F which is related to the welding voltage and to the welding current density by $$F = c \sin\left(\frac{I-d}{e}\right)\pi + \left(\frac{2V-f}{g}\right)$$

The heavy forging has uniform chemical properties and mechanical properties, and comprises a first forging, a second forging defining with the first forging a mold cavity having a gap width, and a weldment in the mold cavity having a substantially vertical dendrite growth and connecting the first forging and the second forging, the weldment having a composition matching that of the first forging and the second forging, and being formed with a form factor which is related to the welding voltage and to the welding current density by $$F = c \sin\left(\frac{I-d}{e}\right)\pi + \left(\frac{2V-f}{g}\right)$$

The welding apparatus for producing a heavy forging having uniform chemical properties and mechanical properties, comprises a first forging, a second forging disposed a gap width from the first forging and defining with the first forging a mold cavity, mold cavity extension means disposed about the mold cavity to provide peripheral mold cavity extensions for the mold cavity, a welding electrode disposed in registry with the mold cavity and reciprocable in the mold cavity, welding power means connected between the welding electrode and one of the first forging and the second forging to produce a weldment between the first forging and the second forging, the weldment having a composition matching that of the first forging and the second forging; and said weldment having substantially vertical dendrite growth formed by maintaining during welding thereof a form factor F which is related to the welding voltage and to the welding current density by $$F = c \sin\left(\frac{I-d}{e}\right)\pi + \left(\frac{2V-f}{g}\right)$$

BACKGROUND OF THE INVENTION

Heretofore, the size of a heavy forging, such as a rotor, has been limited by the maximum size and weight of the largest single steel ingot which can be produced by the output of several furnace heats of steel. The largest such steel ingot currently available, is about 134 inches in diameter and has a weight of about 650,000 pounds. After reheating the massive solidified ingot, the ingot is forged on a heavy press and the dischard or crop portions on the bottom of and the top of the massive forged ingot (often comprising about 40 percent of the total weight thereof) are removed from the massive forged ingot. Such massive forged ingot is then further forged to the desired rotor shape and machined to the required tolerances with attendant losses by the forging and machining operations of additional weight and a resultant rotor having a maximum weight in the range of 325,000 to 375,000 pounds. In addition to the limitation on the size of the large forgings produced by conventional methods, such conventionally produced large forgings exhibit undesirable variations in chemical composition that are proportional to the weight of the ingot from which they are produced and that can adversely affect the uniform mechanical properties.

Conventional fabricating techniques are disclosed in "Electroslag Welding" by P. E. Paton, Library of Congress Catalog Card No. 62–13421 and the following United States patents: 2,997,571, Smout, Aug. 22, 1961; 3,171,013, Danheir, Feb. 23, 1965; 3,180,970, Gilson et al., Apr. 27, 1965; 3,197,604, Turbyville et al., July 27, 1965; 3,243,-568, Burden, Mar. 29, 1966; 3,253,121, Robbins, May 24, 1966.

OBJECTS OF THE INVENTION

It is the general object of the present invention to avoid and overcome the foregoing and other difficulties of and objections to prior art practices by the provision of an improved method of and apparatus for fabricating large forgings and an improved heavy forging produced thereby, which heavy forgings have improved uniformity of chemical composition by overcoming the extreme degrees of segregation that would be present in the very large ingots, that weigh much more than 650,000 pounds and that would be required to produce the large forgings in the weight class 400,000–550,000 pounds. A further additional objective of this invention is the provision of an improved method of and apparatus for fabricating large forgings and an improved heavy forging having improved uniformity of chemical composition in the sizes currently produced, and improved uniformity of mechanical properties through better variability in chemical composition.

BRIEF SUMMARY OF THE INVENTION

The aforesaid objects of the present invention, and other objects which will become apparent as the description proceeds, are achieved by providing an improved method of fabricating a heavy forging from a first ingot and a second ingot comprising the steps of heating the first ingot and the second ingot to forging temperature, forging the heated first ingot and the second ingot to a desired configuration, positioning the first forged ingot and the second forged ingot to provide a mold cavity having a gap width, extending the mold cavity to provide the mold cavity with peripheral edge defect extensions, and electroslag welding together the first forged ingot and the second forged ingot with a weldment having a substantially vertical dendrite growth by maintaining during the electroslag welding a form factor F which is related to the gap width Wg by $F = a(Wg+b)$, where $a$ and $b$ are constants for a particular composition of steel, or to the welding voltage V and to the welding current density I by $$F = c \sin\left(\frac{I-d}{e}\right)\pi + \left(\frac{2V-f}{g}\right)$$

where $c$, $d$, $e$, $f$ and $g$ are constants for a particular composition of steel.

Electroslag welding apparatus is provided for producing a heavy forging having uniform chemical properties and mechanical properties. The electroslag welding apparatus comprises a first forging and a second forging disposed a gap width from the first forging and defining with the first forging a mold cavity. Mold cavity extension means are disposed about the mold cavity to provide peripheral mold cavity extensions for the mold cavity. A welding electrode is disposed in registry with the mold cavity and reciprocable in the mold cavity. Welding power means is connected between the welding electrode and one of the first forging and the second forging to produce a weldment between the first forging and the second forging. The weldment has a composition matching that of the first forging and the second forging. The weldment has substantially vertical dendrite growth formed by maintaining during welding thereof a form factor F which is related to the welding voltage and to the welding current density by $$F = c \sin\left(\frac{I-d}{e}\right)\pi + \left(\frac{2V-f}{g}\right)$$

An improved heavy forging is provided having improved uniformity of chemical properties and mechanical properties, the heavy forging comprising a first forging, a second forging defining with the first forging a mold cavity having a gap width, and a weldment in the mold cavity having a substantially vertical dendrite growth and connecting the first forging and the second forging, the weldment being formed with a form factor F which is related to the gap width $Wg$ by $F = a(Wg) + b$, or to the welding voltage and to the welding current density by $$F = c \sin\left(\frac{I-d}{e}\right)\pi + \left(\frac{2V-f}{g}\right)$$

BRIEF DESCRIPTION OF THE SEVERAL VIEWS OF THE DRAWINGS

For a better understanding of the present invention reference should be had to the accompanying drawings, wherein like numerals of reference indicate similar parts throughout several views and wherein.

Although the principles of the present invention are broadly applicable to heavy forgings, the present invention is particularly adapted for use in conjunction with rotor and collared forgings and hence it has been so illustrated and will be so described.

DETAILED DESCRIPTION

Method

Figures 1, 2:
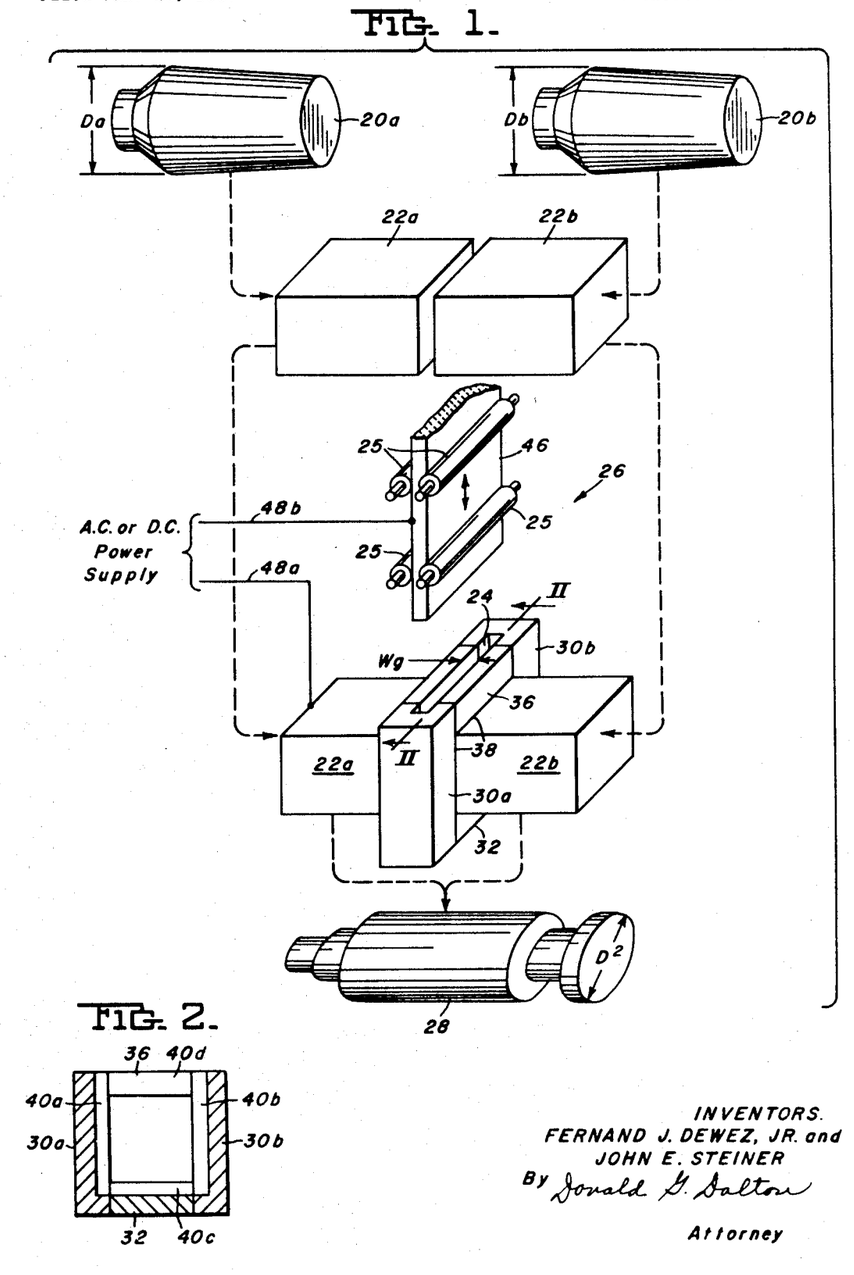
FIGURE 1 is a flow diagram, in perspective showing the improved method of fabricating a heavy forging, such as a rotor forging, and the electroslag welding apparatus associated therewith.
FIGURE 2 is a vertical sectional view taken along the line II—II of FIGURE 1 in the direction of the arrows.

With specific reference to the form of the present invention illustrated in the drawings, and referring particularly to the improved method of fabricating shown in FIGURE 1, a first ingot and a second ingot, each having a diameter $Da$, $Db$ of about 110 inches and weighing about 550,000 pounds are indicated generally by the reference numerals 20a, 20b. These ingots 20a, 20b have, for example, the Ni-Mo-V steel composition shown in Table I below.

TABLE I (PERCENT BY WEIGHT)

| | |
|---|---|
| C | 0.17–0.27 |
| Mn | 0.20–0.60 |
| P (max.) | 0.015 |
| S (max.) | 0.018 |
| Si (max.) | 0.35 |
| Ni | 2.5–4.5 |
| Cr (max.) | 0.5 |
| V | 0.03–0.3 |

In order to prepare the ingots 20a, 20b for a forging operation, such ingots 20a, 20b are heated to a temperature of about 2250° F. in a forge furnace (not shown) but similar to the car bottom type, forged to desired rectangular cross section configuration, such as a square cross section of about 70 inches square on a heavy forge press (not shown), and then cropped or sheared under such heavy forge press to provide the blooms 22a, 22b. Preparatory for an electroslag welding operation, the faces to be welded of the blooms 22a, 22b are made plane or trued up by gas-cutting apparatus (not shown) and/or machining operations, and the blooms 22a, 22b are positioned to provide a mold cavity 24 having a gap width $Wg$ (FIGURES 1, 3).

Welding apparatus

Figure 3:
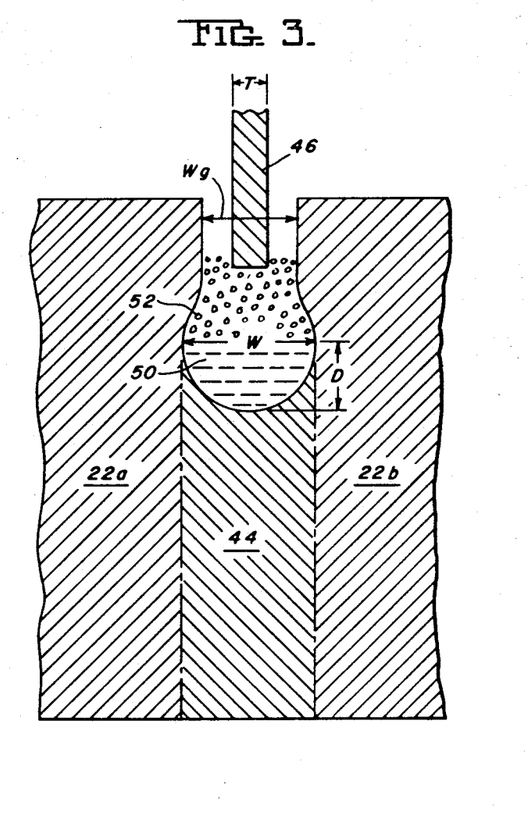
FIGURE 3 is a fragmentary vertical sectional view of the weld zone of the electroslag welding apparatus.

The improved electroslag welding apparatus 26 (FIGURE 1) for producing a heavy forging 28 having uniform appearance, chemical properties, mechanical properties and heat indication stability from the blooms 22a, 22b has mold cavity extension means, such as the side plates 30a, 30b, bottom plate 32 and top plate 36 which are disposed about the mold cavity 24 and welded to the blooms 22a, 22b at 38 to provide by means of the mold cavity extension slots 40a, 40b, 40c, 40d (FIGURE 2) in the plates 30a, 30b, 32, 36, weldment extensions (not shown) for the weldment 44 (FIGURE 3).

Figure 4:
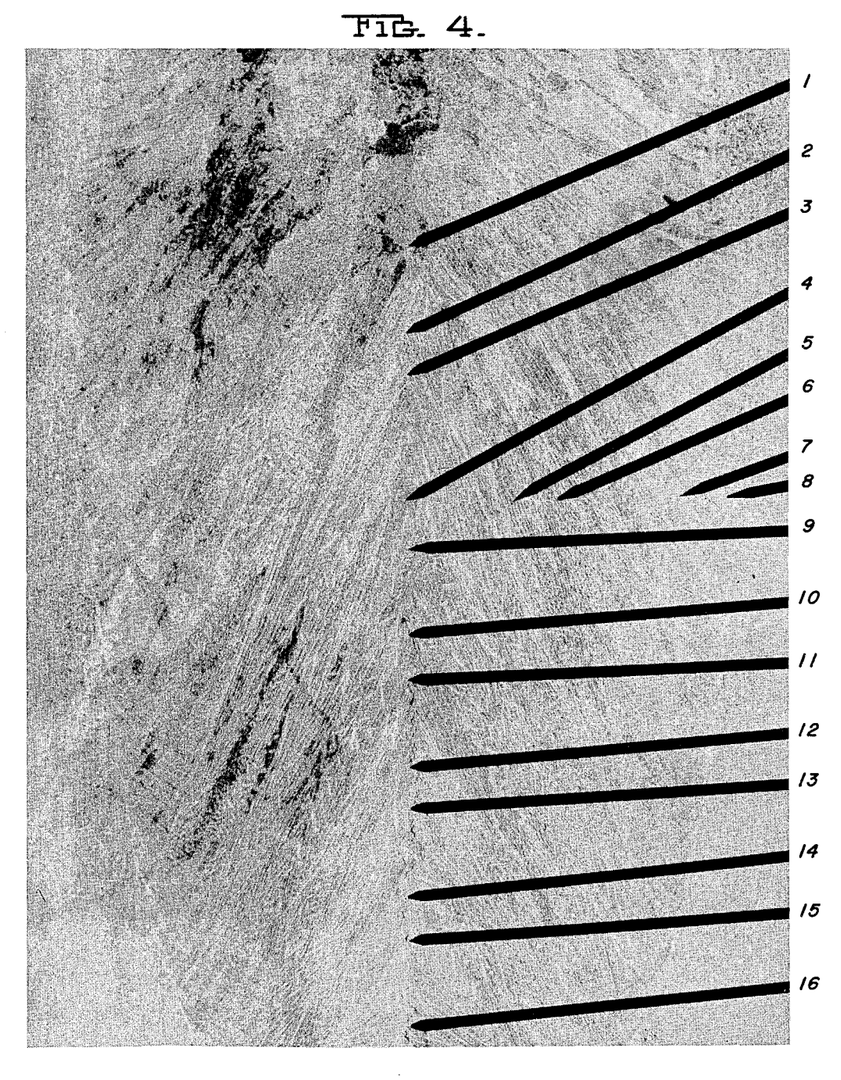
FIGURE 4 is an enlarged fragmentary view of the weldment showing the vertical dendrite growth.

A welding electrode 46 of the plate type and having substantially the same chemical composition as the blooms 22a, 22b (FIGURE 1) is disposed above the mold cavity 24 in registry with the mold cavity 24 and is reciprocable by conventional drive means, such as pinch rolls 25, in the mold cavity 24. Welding power means, such as a suitable power supply indicated in FIGURE 1 by the legend "A-C or D-C power supply" are connected by lines 48a, 48b between the welding electrode 46 and one of the blooms 22a, 22b, in this case bloom 22a, to produce the weldment 44 between the blooms 22a, 22b. Employing a flux, such as a manganese silicate type flux, an arc is initiated between the plate electrode 46 and the starter plate 32 thus producing a molten metal pool 50 (FIGURE 3) and slag pool 52 above the weldment 44. As shown in FIGURE 4, the weldment 44 has a substantially vertical dendrite growth formed by maintaining during welding a suitable form factor F (i.e. the ratio of the width W of the molten metal pool 50 to its depth D). The heat from the molten pool 50 (FIGURE 3) is conducted away from the molten pool 50 in a direction perpendicular to a series of tangents to the solidus line (i.e., the demarcation line where the solid and liquid states are in equilibrium). The dendrites grow parallel to these directions.

FIGURES 5A–5E show a family of curves covering a wide range of steels of different composition, such as the aforementioned Ni-Mo-V rotor steel and AISI 1005 steel.

In order to obtain the data shown in FIGURES 5A–5E the gap width $Wg$, welding voltage V, and current density I were varied and the weldments 44 sectioned for examination for the desired vertical dendrite growth shown in FIGURE 4.

Referring to FIGURES 5A–5E, the form factor F is related to the gap width $Wg$ by $F=a(Wg)+b$ and to the welding voltage and to the welding current density by $$F = c \sin\left(\frac{I-d}{e}\right)\pi + \left(\frac{2V-f}{g}\right)$$

Figure 5A:
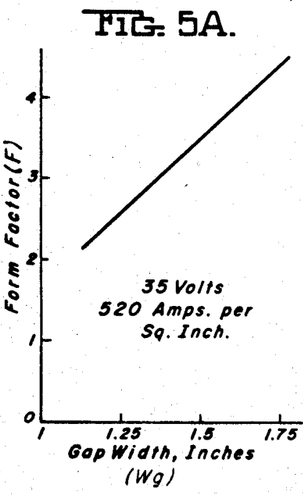
FIGURES 5A–5E are graphs of form factor versus gap width (inches) welding voltage (volts) and welding current density (amperes/square inch)

In FIGURE 5A the form factor F is related to the gap width $Wg$ by the relationship:

$$F = a(Wg) + b$$

where $a$ and $b$ are constants determined by the welding voltage V, welding current density I and the gap width $Wg$. For the Ni-Mo-V steel example given above:

$$F = 3.6(Wg) - 1.9$$

where the welding voltage V is about 35 v., the welding current density I is about 520 amperes/square inch, and the gap width $Wg$ is between about 1 inch and 2 inches.

As shown in FIGURE 5A the constant $a$ is the slope of the line and the constant $b$ is the Form Factor axis intercept, utilized to develop the equation $F=a(Wg)+b$ to fit the data of FIGURE 5A.

Figure 5B:
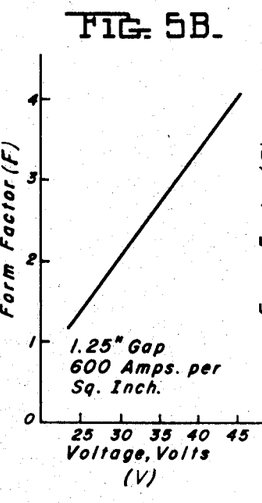
Figure 5C:
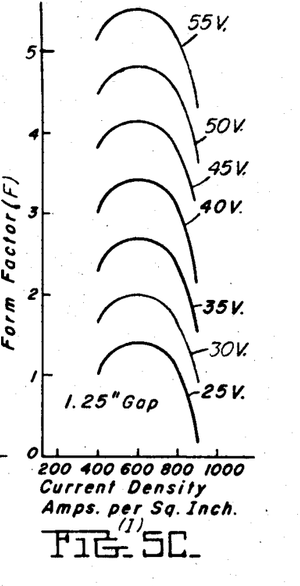
Figure 5D:
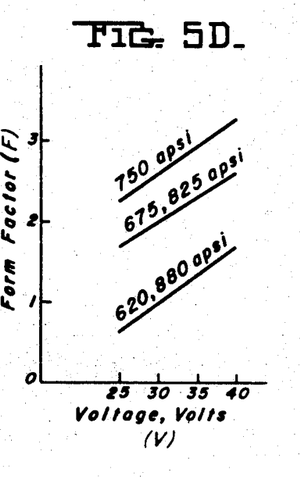
Figure 5E:
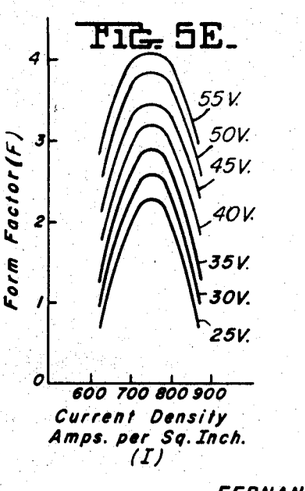

Referring to FIGURES 5B–5C, the form factor F is related to the welding voltage V and welding current density I by $$F = c \sin\left(\frac{I-d}{e}\right)\pi + \left(\frac{2V-f}{g}\right)$$

where $c, d, e, f, g$ are constants determined by the gap width $Wg$, welding voltage V, and the welding current density I. For the given Ni-Mo-V steel sample:

In the sine type curves shown in FIGURES 5C, 5E, the constant $c$ is the amplitude factor; the constant $d, e$ are constants to convert the current density to radian measure between 0° and 180°; and the constants $f, g$ are factors for translating the curves from the current density axis. Such constants are utilized to develop the equation $$F = c \sin\left(\frac{I-d}{e}\right)\pi + \left(\frac{2V-50}{15}\right)$$

to fit the data of FIGURES 5C, 5E.

$$F = 1.4 \sin\left(\frac{I-200}{800}\right)\pi + \left(\frac{2V-50}{15}\right)$$

where the gap width is about 1–2 inches, the welding voltage V is in the range of 25 to 55 volts and the welding current density I is in the range of about 300 to 1000 amperes/square inch.

For the given AISI 1005 steels as shown in FIGURE 5D and FIGURE 5E:

$$F = 1.6 \sin\left(\frac{I-620}{260}\right)\pi + \left(\frac{2V-26.6}{33.4}\right)$$

where the gap width is about 1¼ inches, the welding voltage V is in the range 25 to 55 volts and the welding current density I is in the range 600 to 900 amperes/square inch.

As shown on page 3 of Standard Steels published April 1966, by United States Steel Corporation, AISI 1005 steel has the composition shown in Table II below:

TABLE II (PERCENT BY WEIGHT)

| | |
|---|---|
| C | 0.02–0.06 |
| Mn | 0.20–0.40 |
| P (max.) | 0.040 |
| S (max.) | 0.050 |
| Si (max.) | 0.10 |

In order to eliminate cracks in the weldment 44 (FIGURE 3), the form factor F of the molten metal pool 50 of Ni-Mo-V steel should be greater than 3.0, the welding voltage should be in the range of about 25 to 55 volts, and the welding current density should be in the range of about 300–1000 amperes/square inch of cross section of the plate electrode 46. In the case of AISI 1005 steel, in order to eliminate cracks in the weldment 44, the form factor F of the molten metal pool 50 should be greater than 1.0. Further the ratio of gap width $Wg$ to the thickness T of the plate electrode 46 in both cases should be greater than 3.0 with a gap width $Wg$ greater than 1 inch.

In addition the form factor F is inversely proportional to the melt-off ratio $Rmo$ of the welding electrode 46 and the deposition rate $Rd$ of metal in the weldment 44.

After completion of the electroslag welding operation, the weldment extensions (not shown) and edge defects contained therein are removed from the welded forging (not shown) by conventional steel plant gas-cutting apparatus, such as oxygen acetylene burning or scarfing torches or machining means.

Thereafter, the heavy welded forging (not shown) is reheated to a forging temperature of about 2250° F. and forged by the above-mentioned forge (not shown) to the rotor forging 28 (FIGURE 1) having, for example, a weight of about 600,000 pounds and a diameter $D^2$ of about 65 inches, and heat treated such as normalizing-tempering, double normalizing-tempering, normalize-quench temper, or quench-temper.

Forging

The excellent quality of these weldments 44 suggests that full size rotor forgings made by this method should have excellent magnetic properties (permeability) and excellent thermal stability (heat indication test).

As shown in FIGURE 4 and in Chemical Properties, Table II, and Mechanical Properties, Table III below, a heavy welded forging (not shown) has been produced having uniform chemical composition and mechanical properties.

TABLE II.—CHEMICAL COMPOSITION OF Ni-Mo-V ROTOR STEEL

| Ident. No. | C | Mn | P | S | Si | Ni | Mo | V |
|---|---|---|---|---|---|---|---|---|
| 1 | .19 | .46 | .008 | .015 | .15 | 2.73 | .25 | .025 |
| 2 | .18 | .50 | .008 | .016 | .19 | 3.12 | .30 | .028 |
| 3 | .18 | .47 | .008 | .015 | .19 | 3.30 | .31 | .028 |
| 4 | .18 | .50 | .008 | .014 | .18 | 3.33 | .30 | .028 |
| 5 | .19 | .50 | .010 | .019 | .19 | 3.33 | .30 | .038 |
| 6 | .18 | .48 | .008 | .017 | .18 | 3.42 | .30 | .028 |
| 7 | .18 | .47 | .009 | .017 | .17 | 3.40 | .30 | .026 |
| 8 | .18 | .32 | .007 | .012 | .24 | 3.37 | .27 | .032 |
| 9 | .18 | .50 | .008 | .014 | .18 | 3.37 | .32 | .028 |
| 10 | .18 | .48 | .010 | .017 | .18 | 3.26 | .30 | .028 |
| 11 | .19 | .51 | .008 | .017 | .18 | 3.20 | .32 | .028 |
| 12 | .19 | .53 | .010 | .022 | .18 | 3.42 | .32 | .026 |
| 13 | .18 | .51 | .008 | .016 | .17 | 3.37 | .32 | .025 |
| 14 | .18 | .54 | .010 | .019 | .18 | 3.20 | .32 | .026 |
| 15 | .17 | .54 | .010 | .018 | .18 | 3.55 | .34 | .028 |
| 16 | .17 | .58 | .011 | .018 | .18 | 3.42 | .30 | .025 |
| Forgings 22a, 22b | .20 | .30 | .006 | .014 | .27 | 3.65 | .27 | .030 |
| Plate Electrode 46 | .17 | .28 | .007 | .015 | .26 | 3.39 | .31 | .030 |

TABLE III.—MECHANICAL PROPERTIES OF Ni-Mo-V STEEL ELECTROSLAG WELDMENTS

| Specimen location | Processing sequence | Orientation in forging | Yield strength p.s.i. | Tensile strength p.s.i. | Elongation in 1-inch, percent | Reduction of area, percent | 50% shear fracture transition temperature | Maximum Energy absorbed, ft./lb. |
|---|---|---|---|---|---|---|---|---|
| Forgings 22a, 22b | Heat treated | Axial | 63,000 | 84,000 | 30.3 | 70.4 | +20 | 130 |
| | | Radial | 62,700 | 84,300 | 30.0 | 65.1 | +60 | 80 |
| Weldment 44 | Forged and heat treated | Axial | 67,400 | 88,400 | 27.0 | 66.9 | +40 | 105 |
| | | Radial | 65,100 | 86,900 | 25.5 | 59.2 | +50 | 75 |
| Do | Heat treated only | Axial | 66,400 | 87,800 | 27.0 | 65.0 | +40 | 90 |
| | | Radial | 65,800 | 87,900 | 27.0 | 67.6 | +25 | 85 |

ALTERNATIVE EMBODIMENTS

Figure 6:
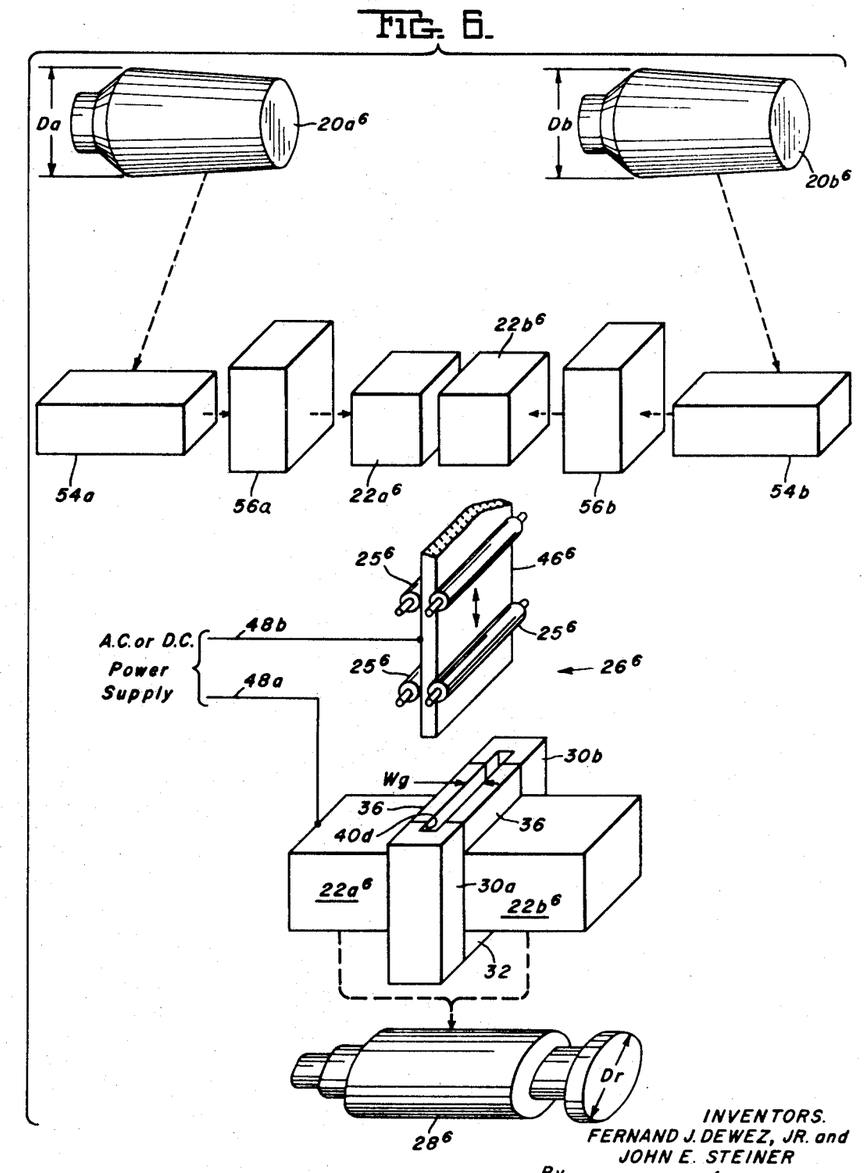
FIGURE 6 is a view similar to FIGURE 1 showing an alternative method of fabricating a rotor forging where a larger finished diameter of the heavy forging is required than the heavy forging shown in FIGURE 1.

It will be understood by those skilled in the art that (in the method alternatively shown in FIGURE 6) ingots $20a^6$, $20b^6$ having for example about a 110 inch diameter $Da$, $Db$ are heated and forged into forgings 54a, 54b having about 65 inch square cross section, about 170 inch usable length and usable weight of about 200,000. The forgings 54a, 54b are then upset by hammering one end thereof to forgings 56a, 56b having about 90 square inch cross section and finally forged back to forgings $22a^6$, $22b^6$ having about 80 inch square cross section. After electroslag welding of the blooms $22a^6$, $22b^6$ into a welded bloom (not shown), such welded bloom is then forged to the heavy forging $28^6$ having a diameter $Dr$ of about 80 inches and a weight of about 400,000 pounds. To obtain a heavier forging 28 a third bloom (not shown, but similar to blooms $22a^6$, $22b^6$) could be welded to the welded bloom (not shown).

Figure 7:
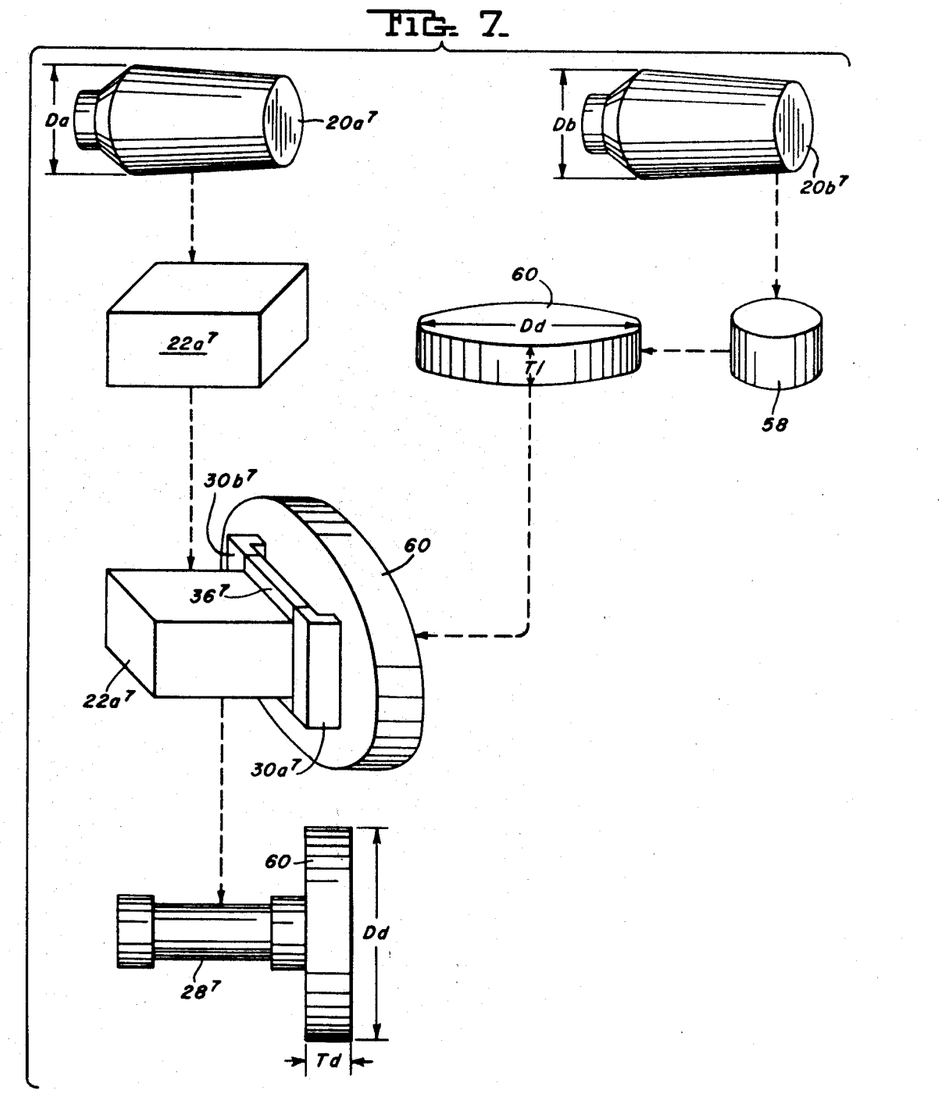
FIGURE 7 is a view similar to FIGURES 1, 6 showing a method of fabricating a heavy forging provided with a collar.

In FIGURE 7, one of the heated ingots $20a^7$, $20b^7$ having a diameter $Da$, $Db$ of about 110 inches (in this case $20a^7$) is forged to a bloom $22a^7$ having about a 70 square inch cross section while the other heated ingot $20b^7$ is forged to a forging 58 and then upset to a disc forging 60 having a diameter $Dd$ of about 170 inches and a thickness $T$ of about 30 inches. After electroslag welding, the welded bloom (not shown) is forged to the water wheel type heavy forging or the hydroelectric generator shaft type heavy forging $28^7$. Another bloom (not shown, but similar to the bloom $22a^7$) may be then welded to the disc 60 of the welded bloom (not shown).

Figure 8:
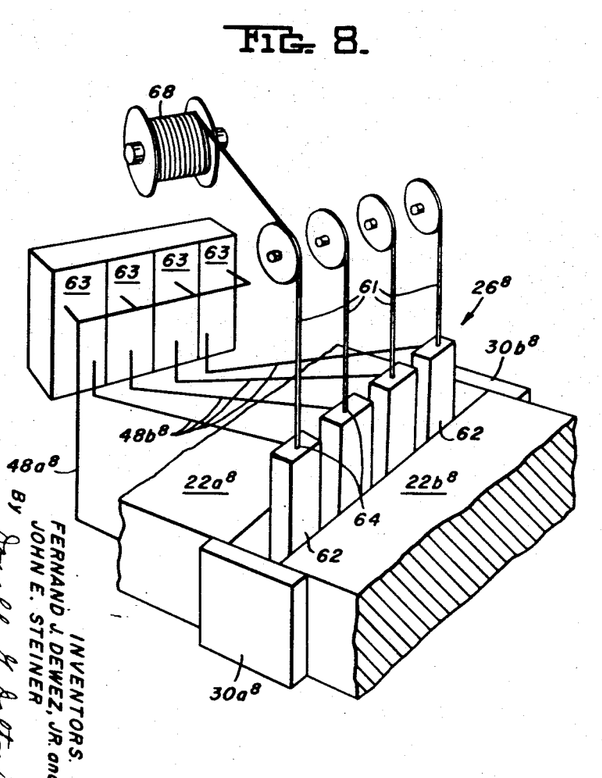
FIGURE 8 is a perspective of an alternative electroslag welding apparatus.

In FIGURE 8 in lieu of the plate electrode 46 (FIGURES 1, 7) a plurality of fixed consumable nozzles 62 are provided with guide holes 64 in which electrode wires 61 (from reels 68) reciprocate.

Figure 8A:
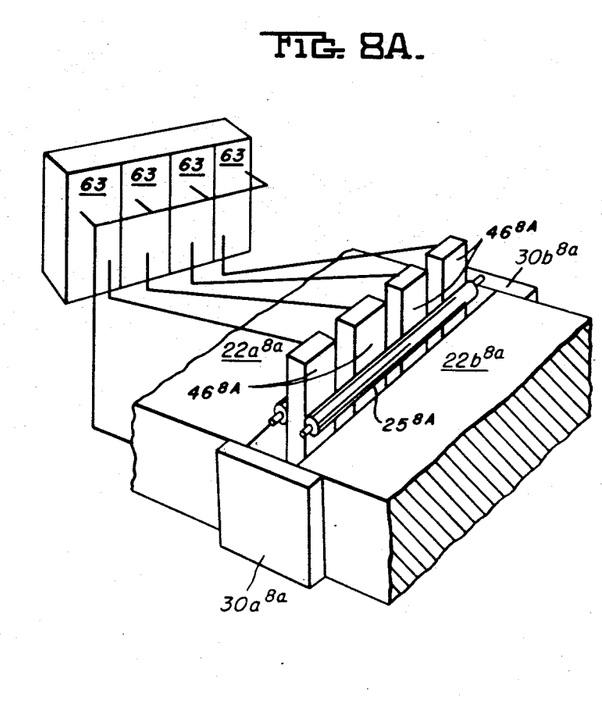
FIGURE 8A is a fragmentary perspective of another alternative electroslag welding apparatus.

In FIGURE 8A are shown a plurality of plate electrodes $46^{8A}$ each connected to a separate welding power means 63.

Figure 9:
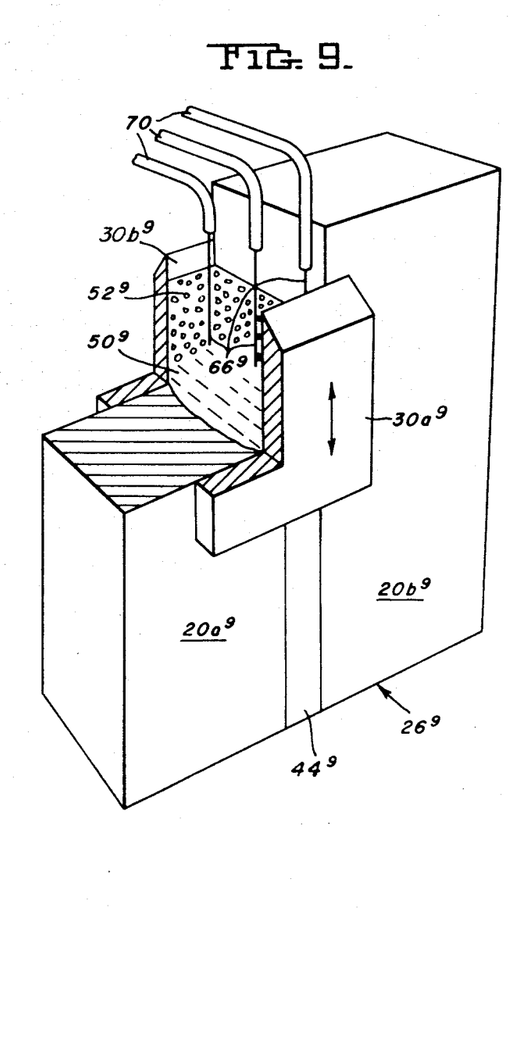
FIGURE 9 is a perspective of a further embodiment of the electroslag welding apparatus.

Further, as shown in FIGURE 9, a plurality of wire electrodes $66^9$ are fed through arcuate guides 70.

SUMMARY OF THE ACHIEVEMENTS OF THE OBJECTS OF THE INVENTION

It will be recognized by those skilled in the art that the objects of the present invention have been achieved by providing an improved method of an apparatus for fabricating heavy forgings 28 (FIGURE 1), $28^6$ (FIGURE 6) and $28^7$ (FIGURE 7), which forgings have improved uniformity of chemical composition and improved uniformity of mechanical properties through better control of variations in chemical composition.

By utilizing the extreme ranges of the welding voltage V, namely about 25 to 55 volts, the extreme ranges of the welding current density I, namely about 300 to 1000 amperes/square inch and the constants derived from the graphs shown in FIGURES 5A through 5E, the extreme ranges for the form factor F, namely about 1.0 to 5.2, can be calculated.

While in accordance with the patent statutes preferred and alternative embodiments of the present invention have been illustrated and described in detail, it is to be particularly understood that the invention is not limited thereto or thereby.

We claim:

1. An improved method of fabricating a heavy forging for a first forging and a second forging, each having a carbon content in the range of about 0.02% by weight to about 0.27% by weight, said method comprising the steps of:
    (a) positioning said first forging and said second forging to provide a mold cavity having a gap width in the range of about 1.0 inch to about 2.0 inches,
    (b) extending said mold cavity to provide said mold cavity with peripheral edge defect extensions, and
    (c) electroslag welding together said first forging and said second forging with a weldment having a composition matching that of said first forging and said second forging, while maintaining a form factor F in the range of about 1.0 to about 5.2 to produce a substantially vertical dendrite growth.

2. The improved method recited in claim 1 wherein said form factor F is related to the welding voltage V, and to the welding current density I by $$F = c \sin\left(\frac{I-d}{e}\right)\pi + \left(\frac{2V-f}{g}\right)$$

and c is in the range of about 1.4 to about 1.6; d is in the range of about 200 to about 620; e is in the range of about 800 to about 260; f is in the range of about 50 to about 26.6, and g is in the range of about 15 to about 33.4.

3. The improved method recited in claim 1 wherein said form factor F is related to said gap width $Wg$ by $F = a(Wg) + b$.

4. The improved method recited in claim 1 and having said welding voltage in the range of about 25 to 55 volts.

5. The improved method recited in claim 1 and having a welding current density in the range of about 300–1000 amperes/square inch.

6. The improved method recited in claim 1 wherein the ratio of said gap width to the thickness of the welding electrode is greater than about 3.0.

7. An improved heavy forging having uniform chemical properties and mechanical properties, said heavy forging comprising:
    (a) a first forging,
    (b) a second forging defining with said first forging a mold cavity having a gap width in the range of about 1.0 inch to about 2.0 inches.
        (1) said first forging and said second forging each having a carbon content in the range of about 0.02% by weight to about 0.27% by weight, and
    (c) an electroslag weldment in said mold cavity having a substantially vertical dendrite growth and connecting said first forging and said second forging,
        (1) said weldment having a composition matching that of said first forging and said second forging, and
        (2) being formed while maintaining a form factor F in the range of 1.0 to about 5.2 to produce said substantially vertical dendrite growth.

8. The improved heavy forging recited in claim 7 wherein said form factor F is related to the welding voltage V and to the welding current density I by $$F = c \sin\left(\frac{I-d}{e}\right)\pi + \left(\frac{2V-f}{g}\right)$$

and c is in the range of about 1.4 to about 1.6, d is in the range of about 200 to about 620; e is in the range of about 800 to about 260; f is in the range of about 50 to about 26.6, and g is in the range of about 15 to about 33.4.

9. The improved heavy forging recited in claim 7 wherein said form factor F is related to said gap width $Wg$ by $F = a(Wg) + b$.

10. Electroslag welding apparatus for producing a heavy forging from a first forging and a second forging disposed a gap width in the range of about 1.0 inch to about 2.0 inches from said first forging and defining with said first forging a mold cavity, said apparatus comprising:
    (a) mold cavity extension means disposed about said mold cavity to provide peripheral mold cavity extensions for said mold cavity,
    (b) a welding electrode disposed in registry with said mold cavity and reciprocable in said mold cavity, and
    (c) welding power means connected between said welding electrode and one of said first forging and said second forging to produce a weldment between said first forging and said second forging,
   (1) said weldment having a composition matching that of said first forging and said second forging, and
   (2) being formed while maintaining a form factor F in the range of 1.0 to about 5.2 to produce substantially vertical dendrite growth.

11. The electroslag welding apparatus recited in claim 10 wherein said form factor F is related to said gap width Wg by $F=a(Wg)+b$.

12. The electroslag welding apparatus recited in claim 10 wherein said welding electrode is of the plate type.

13. The electroslag welding apparatus recited in claim 10 wherein said electrode has a plurality of plates, each connected to a separate welding power means.

14. The electroslag welding apparatus recited in claim 10 wherein said welding electrode has a fixed consumable electrode and an electrode wire reciprocable in said fixed consumable electrode.

15. The electroslag welding apparatus recited in claim 10 wherein said welding electrode has a guide and an electrode wire reciprocable in said guide.

References Cited
UNITED STATES PATENTS

| | | | |
|---|---|---|---|
| 2,997,571 | 8/1961 | Smout | 219—126 |
| 3,243,568 | 3/1966 | Burden | 219—73 |
| 3,344,839 | 10/1967 | Sunnen. | |

JOSEPH V. TRUHE, Primary Examiner

J. G. SMITH, Assistant Examiner

U.S. Cl. X.R.

29—196.1, 487; 164—48

UNITED STATES PATENT OFFICE
CERTIFICATE OF CORRECTION

Patent No. 3,467,808　　　　　　　　　　　　　September 16, 1969

Fernand J. Dewez, Jr., et al.

It is certified that error appears in the above identified patent and that said Letters Patent are hereby corrected as shown below:

Column 2, line 1, "dischard" should read -- discard --; line 21, "Danheir" should read -- Danhier --. Column 6, TABLE II, ninth column, line 5 thereof, ".038" should read -- .028 --. Column 7, line 25, "T" should read -- T1 --; line 66, "for" should read -- from --.

Signed and sealed this 27th day of October 1970.

(SEAL)
Attest:

Edward M. Fletcher, Jr.　　　　　　　　　WILLIAM E. SCHUYLER, JR.
Attesting Officer　　　　　　　　　　　　　　　Commissioner of Patents